(12) United States Patent
Levit-Gurevich et al.

(10) Patent No.: US 10,467,118 B2
(45) Date of Patent: Nov. 5, 2019

(54) TECHNIQUES FOR PERFORMANCE ANALYSIS OF PROCESSOR INSTRUCTION EXECUTION

(71) Applicant: INTEL CORPORATION, Santa Clara, CA (US)

(72) Inventors: Konstantin Levit-Gurevich, Kiryat Byalik (IL); Michael Berezalsky, Tirat Carmel (IL); Noam Itzhaki, Yokneam Elit (IL); Arik Narkis, Kiryat Tivon (IL)

(73) Assignee: INTEL CORPORATION, Santa Clara, CA (US)

( * ) Notice: Subject to any disclaimer, the term of this patent is extended or adjusted under 35 U.S.C. 154(b) by 24 days.

(21) Appl. No.: 15/718,435

(22) Filed: Sep. 28, 2017

(65) Prior Publication Data

US 2019/0095309 A1    Mar. 28, 2019

(51) Int. Cl.
  *G06F 9/44*   (2018.01)
  *G06F 11/34*  (2006.01)
  *G06F 11/30*  (2006.01)
  *G06F 11/36*  (2006.01)

(52) U.S. Cl.
  CPC ........ *G06F 11/3409* (2013.01); *G06F 11/302* (2013.01); *G06F 11/3024* (2013.01); *G06F 11/3466* (2013.01); *G06F 11/3688* (2013.01); *G06F 2201/865* (2013.01)

(58) Field of Classification Search
  CPC .............. G06F 11/3409; G06F 11/302; G06F 11/3466; G06F 11/3688; G06F 2201/865
  See application file for complete search history.

(56) References Cited

U.S. PATENT DOCUMENTS 5,941,983 A * 8/1999 Gupta ................... G06F 9/3836
                                        712/214
8,667,470 B2 * 3/2014 Lin .......................... G06F 8/10
                                        717/109

\* cited by examiner

*Primary Examiner* — Anna C Deng

(57) ABSTRACT

Techniques and apparatus for performance analysis of a program are described. In one embodiment, for example, an apparatus may include at least one memory, and logic, at least a portion of comprised in hardware coupled to the at least one memory, to access a program for performance analysis, the program comprising at least one producer instruction and at least one consumer instruction for the at least one producer instruction, and generate an analysis program based on the program, the analysis program comprising a stall time instruction set to determine a stall time of the at least one producer instruction, the stall time instruction set comprising a first time stamp instruction immediately preceding a consumer instruction, a second time stamp instruction immediately following the consumer instruction, and a stall time instruction to determine the stall time as the difference between the second time stamp and the first time stamp. Other embodiments are described and claimed.

25 Claims, 8 Drawing Sheets

```
                            305a
310 SEND R1, Memory Address
312 Add R2, R3
314 Add R4, R5
316 Mul R2, R4
318 Add R6, R1
```

*FIG. 3A*

```
                            305b
310 SEND R1, Memory Address
312 Add R2, R3
314 Add R4, R5
316 Mul R2, R4
350 A=RDTSC
318 Add R6, R1
352 B=RDTSC
354 B=B-A
```

*FIG. 3B*

TECHNIQUES FOR PERFORMANCE ANALYSIS OF PROCESSOR INSTRUCTION EXECUTION

TECHNICAL FIELD

Embodiments herein generally relate to computer processors, and more particularly, to processor performance monitoring and analysis.

BACKGROUND

Performance analysis and simulation is an important step in determining the effectiveness of a processor design. In general, techniques are directed toward locating and addressing software and hardware inefficiencies and fixing avoidable performance issues. For example, conventional analysis methods may determine the total latency of a given instruction, for example, by computing the total time to bring data from memory to a register.

BRIEF DESCRIPTION OF THE DRAWINGS

FIG. 3A illustrates an embodiment of a program.
FIG. 3B illustrates an embodiment of an analysis program.

DETAILED DESCRIPTION

Figure 1:
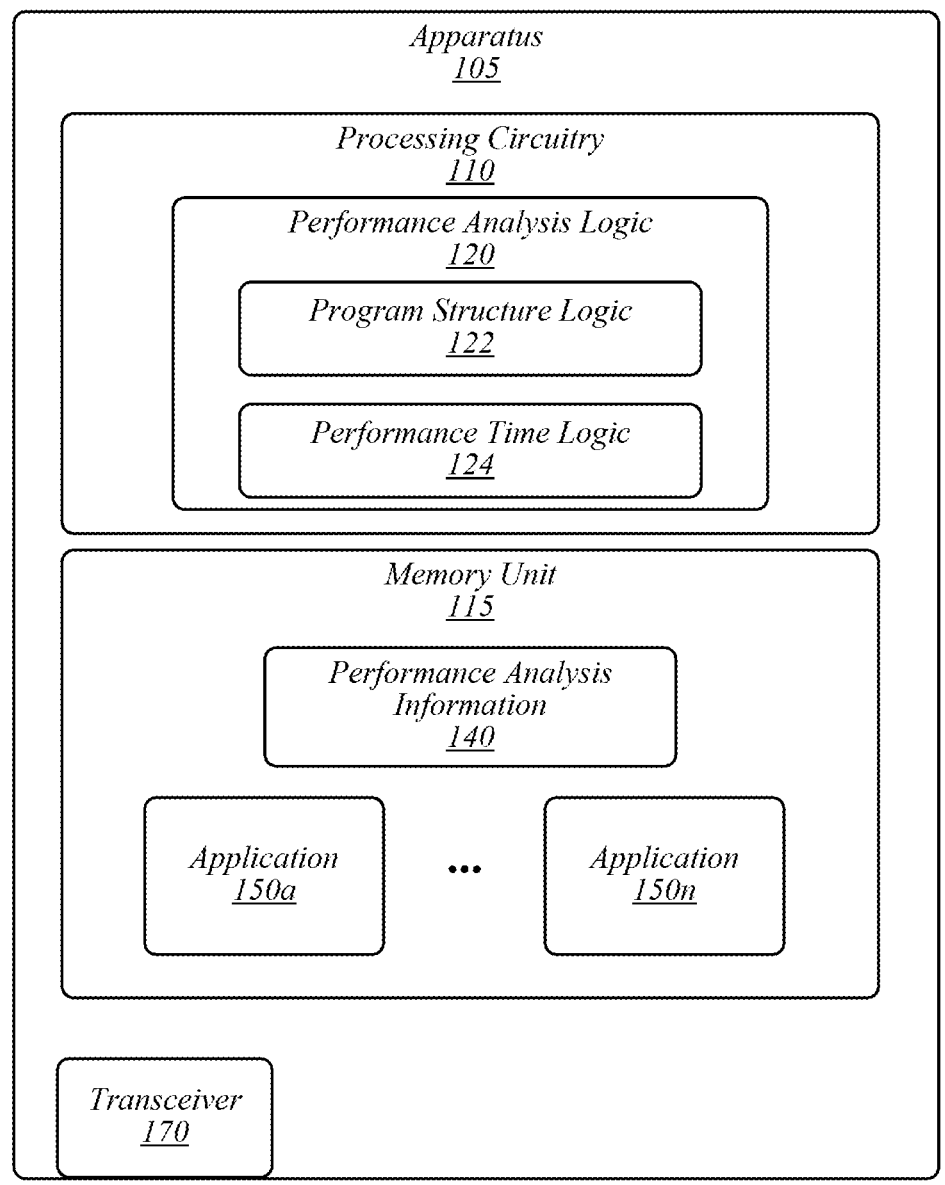
FIG. 1 illustrates an embodiment of a first operating environment.

Various embodiments may be generally directed to techniques for performance analysis of computing device processing components. In some embodiments, a computing device may include a performance analysis logic operative to implement a performance analysis process for determining a discrete performance time of an instruction being executed on a processing component of the computing device. In some embodiments, the performance time may include a duration that is less than the latency time of the instruction. In various embodiments, the performance time may include a segment of the latency time of the instruction. In exemplary embodiments, the performance time may include a stall time. In general, a stall time may include a duration of time that a processing component is waiting for data. For example, a stall time may include a duration of time in which an instruction is blocked (or "stalled") until the end result of an instruction is ready for consumption. In various embodiments, the processing component may include a central processing unit (CPU) or a graphics processing unit (GPU). In some embodiments, the performance analysis logic may be operative to analyze asynchronous instructions, such as a "SEND" instruction. In some embodiments, the performance analysis logic may determine a stall time that indicates how long the processing component stalled waiting for completion of one or more asynchronous instructions.

Conventional performance analysis tools are capable of determining the full latency time of an instruction. In general, the latency time is the difference between the start of an instruction and the availability of the result of the instruction for consumption. For example, conventional processes operate by inserting a "fake consumer" instruction immediately following an asynchronous instruction and measuring execution duration for the fake consumer. This measures the total time taken to bring the data from memory to the register associated with the asynchronous instruction. However, the full latency time does not indicate how long the actual stall time is. In particular, the stall time may be significantly shorter than the latency time, for instance, if other instructions have been executing in parallel to the asynchronous instruction. The difference between the latency time and the stall (or "waste") time may be significant, for instance, 800 cycles. In addition, long latency may not be a material performance issue, while a long stall time may indicate a performance issue with the processing component that needs to be addressed. Therefore, determining the total latency time does not provide sufficient granularity to derive the specific cause of the latency. For example, the completion of an instruction may involve multiple steps, with only one of the steps substantially contributing to the latency time, while the remaining steps operate within expected time boundaries. Conventional performance analysis techniques may be deficient because they are not able to provide adequate information to determine the contribution of a particular step to the total latency time Accordingly, some embodiments may provide a performance analysis logic capable of determining a performance time for processor instructions, including, but not limited to, asynchronous instructions. In various embodiments, the performance analysis logic does not require a fake consumer or other artificial instruction for determining the performance time. More specifically, various embodiments may include a performance analysis logic operative to determine a stall time of an asynchronous instruction. The stall time may be the most direct and accurate indicator of a performance problem, penalty, and/or the like. With knowledge of the stall time of software or firmware instructions, developers may more precisely and efficiently debug, tune, or otherwise design processor hardware and software.

In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner FIG. 1 illustrates an example of an operating environment 100 that may be representative of various embodiments. The operating environment 100 depicted in FIG. 1 may include an apparatus 105 having a processing circuitry 110, a memory unit 115, and a transceiver 170. Processing circuitry 110 may include and or may access logic having instructions for performing operations according to some embodiments. Processing circuitry 110 may be communicatively coupled to memory unit 115 and/or transceiver 170. In various embodiments, processing circuitry 110 may include a CPU or a GPU. In some embodiments, processing circuitry 110 may be implemented on a system-on-a-chip (SoC). In some embodiments, processing circuitry 110 may be implemented as a standalone processor die. Processing circuitry 110 may include one or more processing cores, such as 1, 2, 4, 6, 8, 10, 12, or 16 processing cores. Embodiments are not limited in this context. Processing circuitry 110 may include any type of computational element, such as but not limited to, a microprocessor, a microcontroller, a complex instruction set computing (CISC) microprocessor, a reduced instruction set (RISC) microprocessor, a very long instruction word (VLIW) microprocessor, a virtual processor (for example, a VCPU), or any other type of processor or processing circuit. In some embodiments, processing circuitry 110 may be one or more processors in the family of Intel® processors available from Intel® Corporation of Santa Clara, Calif., such as an Intel® Xeon® processor and/or Intel HD or Iris® graphics processors. Although only one processing circuitry 110 is depicted in FIG. 1, apparatus 105 may include a plurality of processing units Processing circuitry 110 may include and/or may access various logic for performing processes according to some embodiments. For instance, processing circuitry 110 may include and/or may access performance analysis logic 120, program structure logic 122, and/or instruction analysis logic 124. Although FIG. 1 depicts performance analysis logic 120, program structure logic 122, and/or instruction analysis logic 124 as separate logic structures, embodiments are not so limited, as performance analysis logic 120, program structure logic 122, and/or instruction analysis logic 124 may be configured as one or a plurality of logic structures. In addition, performance analysis logic 120, program structure logic 122, and/or performance time logic 124 may be implemented in hardware, software, or a combination thereof. As used in this application, the terms "logic," "component," "layer," "system," "circuitry," "decoder," "encoder," and/or "module" are intended to refer to a computer-related entity, either hardware, a combination of hardware and software, software, or software in execution, examples of which are provided by the exemplary computing architecture 800. For example, a logic, circuitry, or a layer may be and/or may include, but are not limited to, a process running on a processor, a processor, a hard disk drive, multiple storage drives (of optical and/or magnetic storage medium), an object, an executable, a thread of execution, a program, a computer, hardware circuitry, integrated circuits, a controller, application specific integrated circuits (ASIC), programmable logic devices (PLD), digital signal processors (DSP), field programmable gate array (FPGA), a system-on-a-chip (SoC), memory units, logic gates, registers, semiconductor device, chips, microchips, chip sets, software components, programs, applications, firmware, software modules, computer code, combinations of any of the foregoing, and/or the like.

Although performance analysis logic 120 (and logic thereof) is depicted in FIG. 1 as being arranged within processing circuitry 110, embodiments are not so limited. For example, performance analysis logic 120 may be located within an accelerator, a processor core, an interface, an individual processor die, and/or the like and may include other components, such as software, firmware, circuitry and/or the like. In some embodiments, performance analysis logic 120 may include, be a part of, or access a compiler operative to compile code analyzed by performance analysis logic.

Memory unit 115 may include various types of computer-readable storage media and/or systems in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In addition, memory unit 115 may include various types of computer-readable storage media in the form of one or more lower speed memory units, including an internal (or external) hard disk drive (HDD), a magnetic floppy disk drive (FDD), and an optical disk drive to read from or write to a removable optical disk (e.g., a CD-ROM or DVD), a solid state drive (SSD), and/or the like.

In various embodiments, memory unit 115 may store performance analysis information 140 used and/or generated by performance analysis logic 120. In some embodiments, memory unit 115 may store a plurality of applications 150a-n for execution via processing circuitry 110. Applications 150a-n may include various types of software components, programs, applications, firmware, software modules, computer code, code fragments, instructions, processor instructions, asynchronous instructions, assembly code, machine code, binary code, compiled code, combinations of any of the foregoing, and/or the like.

In some embodiments, performance analysis logic 120 may be operative to perform a performance analysis process to determine performance times for instructions of a program executed by a processing component, such as processor circuitry. In various embodiments, the instructions may include one or more asynchronous instructions, such as a SEND instruction. Program structure logic 122 may operate to determine a structure of a program. In general, a program includes a set of instructions for execution by a processing component being analyzed by performance analysis logic 120. In some embodiments, the program may include one of applications 150a-n. In various embodiments, the program may be in assembly language, binary language, compiled form, executable form, and/or the like. In exemplary embodiments, the program may be in assembly language. In various embodiments, the program may be in machine language. In some embodiments, applications 150a-n may include a user interface for performance analysis logic 120. For example, a user interface may provide instrumentation for generating dynamic control-flow traces through analyzed programs and that provides graphical user interface (GUI) objects depicting portions of the analyzed programs and associated stall times.

In some embodiments, program structure logic 122 may determine or be instructed to locate target instructions for analysis, such as producer instructions (for instance, an SEND instruction). Program structure logic 122 may determine consumer instructions for the target instructions. In general, a producer instruction generates or transmits ("sends" or writes) data and a consumer instructions obtains the data from a producer instruction. In general, a target instruction is an instruction where timing information, such as stall time, is desired. A producer instruction may have a plurality of consumer instructions waiting on the producer instruction data, and a consumer instruction may receive data from a plurality of consumer instructions (for instance, an instruction to add the result of two values, with each of the two values written to different registers by two different producer instructions).

In some embodiments, program structure logic 122 may operate to locate consumers of a target instruction by generating control-flow graphs (CFGs), data dependency graphs, map structures, static map structures, and/or other analysis structures on the code of the program under analysis. In some embodiments, program structure logic 122 may generate the analysis structures on machine code of the program. In some embodiments, program structure logic 122 may generate the analysis structures and perform a liveness analysis on the program. In various embodiments, program structure logic 122 may operate to determine the consumers of a target instruction using the analysis structures and the liveness analysis. In some embodiments, program structure logic 122 may operate to statically analyze the program, such as binary code of the program, to generate a bi-directional mapping. For example, program structure logic 122 may map each producer instruction (for instance, SEND instructions) to all possible consumer instructions, and program structure logic 122 may map each consumer to all possible producer instructions.

In various embodiments, program structure logic 122 may be operative to modify a program to generate an analysis program. In some embodiments, the analysis program may include one or more timing instructions that facilitate determining performance times of instructions of the analysis program (see, for example, FIG. 3B). For example, a timing instruction may include a time stamp instruction to determine a time stamp associated with execution of a target instruction. In another example, a timing instruction may include a trace instruction for tracing a path through an analysis program (see, for example, FIG. 5). In various embodiments, the analysis program may include various trace instruction to trace execution of various elements of a program and/or instructions thereof (see, for example, FIG. 5). For example, a trace instruction may be used to identify a particular producer instruction out of a plurality of potential producer instructions associated with a value, operation, and/or the like.

A non-limiting example of a time stamp instruction may include a time stamp counter (TSC) instruction, such as an RDTSC instruction. In another example, a timing instruction may include performing operations on time stamp information, such as subtracting time stamp values associated with a target instruction to determine a difference between time stamps. In some embodiments, the timing instructions may include a plurality of timing instructions that form a stall time instruction set. In various embodiments, a stall time instruction set includes a first time stamp instruction immediately preceding a consumer instruction, a second time stamp instruction immediately following the consumer instruction, and a stall time instruction to determine a stall time as the difference between the second time stamp and the first time stamp. The time stamp instruction set may allow for a determination of a duration of a consumer instruction associated with a particular producer instruction. As the consumer instruction is waiting for the asynchronous producer instruction, this duration is the stall time of the producer instruction.

In exemplary embodiments, performance time logic 124 may be operative to determine one or more performance times for a program, such as an analysis program, executed by processor circuitry. For example, performance time logic 124 may be configured to determine performance time values for analysis logic. In some embodiments, performance time logic 124 may be configured to generate at least a portion of performance analysis information 140. For example, performance time logic 124 may generate analysis information 140 including performance time results for target instructions of an analysis program. In some embodiments, the performance time may be or may include a stall time. In various embodiments, the performance time may include a stall time and the analysis information may include the producer instructions and/or consumer instructions associated with the stall time.

Figure 2:
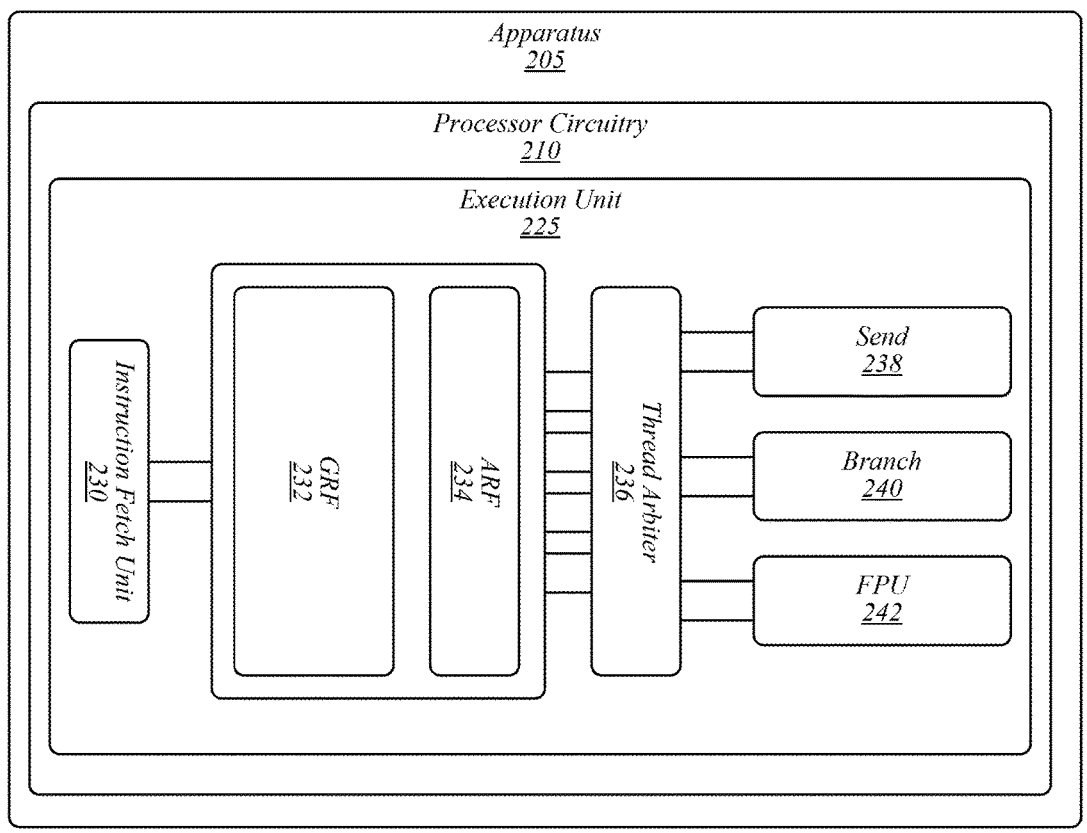
FIG. 2 illustrates an embodiment of a second operating environment.

FIG. 2 illustrates an example of an operating environment 200 that may be representative of various embodiments. The operating environment 200 depicted in FIG. 2 may include an apparatus 205 having processing circuitry 210. In some embodiments, processing circuitry 210 may include one or more execution units 225. In general, an execution unit 225 may include the foundational block of the compute architecture of processing circuitry 210 operative to perform the operations instructed by a program executed by processing circuitry 210. Execution unit 225 may include an instruction fetch unit 230 operative to obtain instructions from an instruction cache or external memory for execution by execution unit 225. Instruction fetch unit 230 may also perform branch prediction of branch instructions. Execution unit 225 may include registers or register files, such as general purpose register file (GRF) 232 and architecture specific registers (ARF) 234 for storing data used during execution of instructions. During an execution cycle, execution unit 225 can issue a plurality of instructions, such as up to four different instructions, which must be sourced to different threads. Thread arbiter 236 may operate to dispatch the instructions to the functional units for execution.

Execution unit 225 may dispatch branch instructions to a dedicated branch unit 240 operative to handle the branch instructions, dispatching thread branch divergence, convergence, nesting, and/or the like. The primary execution units of execution unit 225 are floating point units (FPUs) 242 (for instance, SIMD FPUs). For example, FPUs 242 may handle floating-point and/or integer operations for execution unit 225.

Execution unit 225 may include a send unit 238 for executing SEND instructions. In some embodiments, send unit 238 may execute an asynchronous SEND instruction. In general, the SEND instruction may be a universal I/O instruction for execution unit 225, for instance, bringing data from memory to a register (for instance, GRF 232 and/or ARF 234) of execution unit 225. For example, memory operations, sampler operations, and other longer-latency communications may be dispatched by execution unit 225 via a SEND instruction executed by send unit 238. In some embodiments, the consuming instruction of the SEND instruction may stall, for example, in the case of long latency. In various embodiments, processing circuitry 210 may execute instructions "in order," with the SEND instruction being the only asynchronous instruction. Accordingly, consumer instruction stall time may be dependent on the availability of the data in the cache hierarchy and/or on the number of cycles consumed by earlier instructions.

FIG. 3A illustrates an embodiment of a program. More specifically, FIG. 3A depicts a program 305*a* in pseudocode form. In some embodiments, program 305*a* may be pseudo-assembly code. Program 305*a* may include various instructions 310, 31, 312, 314, 316, and 318 for execution by a computing device, such as processing circuitry 110 of apparatus 105. Instructions 310-318 may have the general form <instruction> <destination register> <source address/register>. SEND instruction 310 may be a target instruction for analysis by performance analysis logic 120. In addition, SEND instruction 310 may be a producer instruction that produces data for a consumer instruction. In general, SEND instruction 310 may involve asynchronously copying the data at the specified memory address to register R1. In program 305*a*, ADD instruction 318 may be a consumer of SEND instruction 310 because ADD instruction 318 uses the value in a register R1 written to by SEND instruction 310.

FIG. 3B illustrates an embodiment of an analysis program. More specifically, FIG. 3B depicts an analysis program 305*b* generated based on program 305*a*. In some embodiments, program structure logic 122 may analyze program 305*a* to determine a time performance of a target instruction, which in this example is SEND instruction 310. The time performance may be a stall time of SEND instruction 310. Program structure logic 122 may determine the consumer of SEND instruction 310, which is ADD instruction 318. To determine the consumer(s) of SEND instruction 310, performance analysis logic (for instance, via program structure logic 122) may build analysis structures, such as a control-flow graph (CFG) and/or data dependency graph, and perform liveness analysis on these graphs. (see, for example, FIGS. 4 and 5). In general, the liveness analysis may include determining variable and register allocation during execution of an application, for example, by a compiler. In some embodiments, the analysis structures may be generated based on machine code of a program. Program 305*a* may be edited using various tools (for example, tools configured to edit various forms of code and/or program files, such as assembly files, machine files, compiler files, and/or the like) to include timing instructions and generate analysis program 305*b*.

In various embodiments, program structure logic 122 may insert timing instruction 350, 352, and 354 in program 305*a* to generate analysis program 305*b*. Timing instruction 350*a* may include generating time stamp "A" immediately prior to ADD instruction 318, and timing instruction 350*b* may include generating time stamp "B" immediately following ADD instruction 318. Timing instruction 350*c* may include determining the stall time for SEND instruction 310 by calculating the difference of time stamp "A" and "B," which provides the amount of time between when processing circuitry 110 starting executing ADD instruction 318 and completed executing ADD instruction 318, excluding intervening instructions (for instance, instructions 312, 314, and 316). Timing instruction 350*c* may store the difference of time stamp "A" and "B" in register or memory location "B." In some embodiments, the results of executing analysis program 305*b* may be stored in performance analysis information 140.

Figure 4:
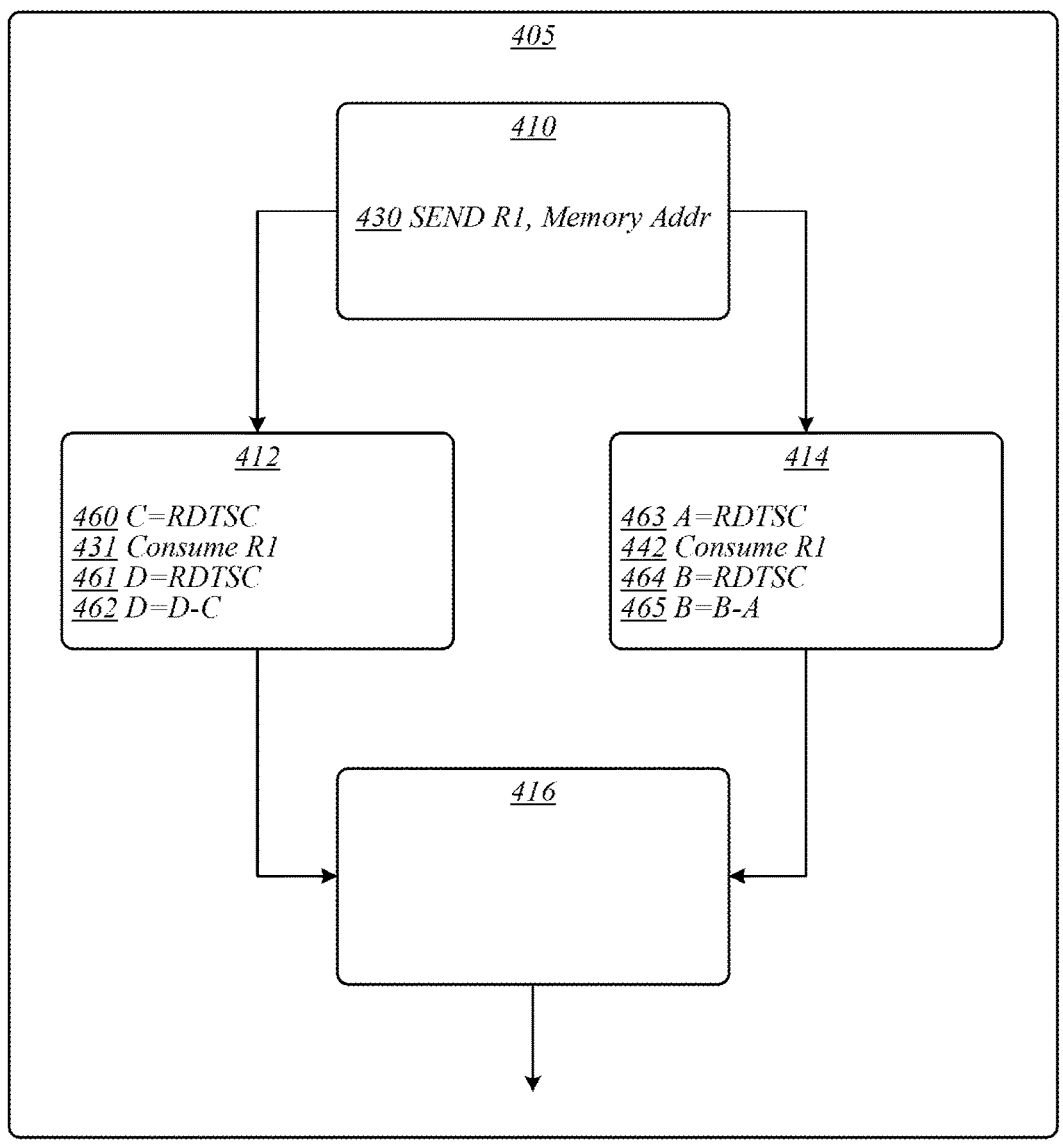
FIG. 4 illustrates a first embodiment of an analysis structure.

FIG. 4 illustrates a first embodiment of an analysis structure. As shown in FIG. 4, an analysis structure may include a control-flow graph 405 graphing the flow of program flow for execution blocks or basic blocks 410, 412, 414, and 416. In general, a basic block may include a linear sequence of program instructions, having one entry point (first instruction executed) and one exit point (last instruction executed). A control-flow graph or graph may generally include a directed graph with basic blocks as nodes and edges representing control-flow graphs. In some embodiments, performance analysis logic 120 (for instance, via program structure logic 122) may analyze a program and generate control-flow graph 405 structuring the execution of the program and determining the producer and consumer relationships between instructions. For example, program structure logic 122 may determine all of the consumers in an application, all of the producers of a program, and the relationships between the consumers and the producers (for instance, which consumers receive data from which producers, which producers provide data to which consumers, and/or the like).

As shown in FIG. 4, control-flow graph 405 may include basic block 410 having a SEND instruction 430. Consumer SEND instruction 430 may be consumed by multiple consumer instructions, each located in a different basic block (for instance, flow-control path). In exemplary embodiments, control-flow graph 405 may be formed as a static map used to associate each consumer to its producer instruction.

Basic block 412 may include consumer instruction 431 and basic block 414 may include consumer instruction 432, which are independent consumers of SEND instruction 430. SEND instruction 410 is a target instruction in which performance analysis logic 120 is operative to determine a timing performance, such as a stall time. Accordingly, program structure logic 122 has generated control-flow graph 405 to include timing instructions 460-465 in association with consumer instructions 431 and 432. Timing instructions 462 may operate to determine stall time "D" based on time stamp "C" instruction 460 and time stamp "D" instruction 461. Timing instructions 465 may operate to determine stall time "B" based on time stamp "A" instruction 463 and time stamp "B" instruction 464. After passing through basic blocks 412 and 414, analysis structure 405 may indicate that control flows through to basic block 416 and on through the rest of the program.

In some embodiments, program structure logic 122 may use analysis structure 405 to modify a program to generate an analysis program that includes timing instructions. In some embodiments, analysis structure 405 may be stored as performance analysis information (for instance, as a file that may be associated with one or more programs and retrieved by performance analysis logic 120). In various embodiments, performance timing logic 124 may determine the timing information resulting from executing an analysis program. In some embodiments, performance timing logic 124 may provide the timing information to various applications, such as developer applications, debugging applications, performance applications, tuning applications, operating system functions, and/or the like.

Figure 5:
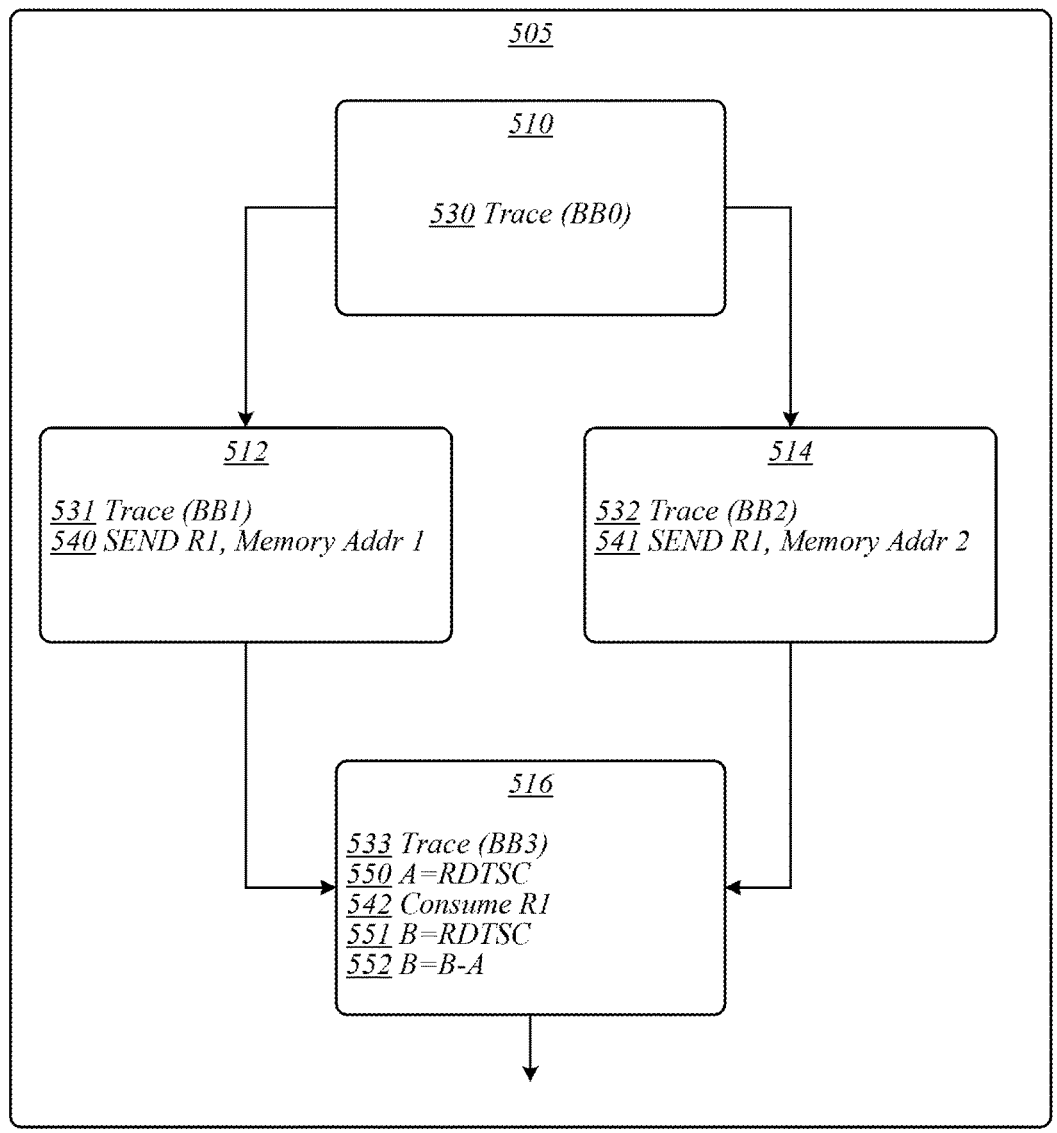
FIG. 5 illustrates a second embodiment of an analysis structure.

FIG. 5 illustrates a second embodiment of an analysis structure. As shown in FIG. 5, an analysis structure may include a control-flow graph 505 graphing the flow of program flow for execution blocks or basic blocks 510 (BB0), 512 (BB1), 514 (BB2), and 516 (BB3). In some embodiments, a single instruction may be the consumer of one of multiple instructions from different basic blocks, some of which may be producers, such as SEND instructions. In various embodiments, for a specific consumer, there may be no more than one potential producer per basic block. Control-flow graph 505 depicts a path for two asynchronous producers (for instance, basic blocks 512 and 514) and one consumer (for instance, block 516). In order to associate a specific execution of this type of consumer-producer relationship, a dynamic flow control trace of control-flow graph 505 may be generated. In general, a trace may include a dynamic sequence of instructions performed during execution of the program mapped by control-flow graph. Accordingly, control-flow graph 505 may allow for the dynamic identification of a specific producer out of multiple potential producers. For example, at a post-processing stage, performance analysis logic may associate each consumer duration to its producer instruction through the dynamic control-flow trace.

Basic block 510 may include trace instruction 510. Basic blocks 512 and 514 may include trace instructions 531 and 532 and SEND instructions 540 and 541, both of which write to register R1. Basic block 516 includes trace instruction 533 and consumer instruction 542 that consumes the value in register R1. In addition, basic block 516 includes timing instructions 550-552 that operate to generate stall time "B" according to some embodiments. Consumer instruction 542 will consume the value in register R1 from one of SEND instructions 540 or 541. Trace instructions 530-533 may provide a trace as the analysis program mapped by control-flow graph is executed. In this manner, the SEND instruction 540 or 541 associated with stall time "B" of basic block 516 may be determined. For example, if the trace indicates trace instruction 531 was triggered, then stall time "B" is the result of SEND instruction 540. Alternatively, if the trace indicates trace instruction 532 was triggered, then stall time "B" is the result of SEND instruction 541. The trace and stall time "B" may be stored as performance analysis information 140.

Included herein are one or more logic flows representative of exemplary methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, hardware, or any combination thereof. In software and firmware embodiments, a logic flow may be implemented by computer executable instructions stored on a non-transitory computer readable medium or machine readable medium, such as an optical, magnetic or semiconductor storage. The embodiments are not limited in this context.

Figure 6:
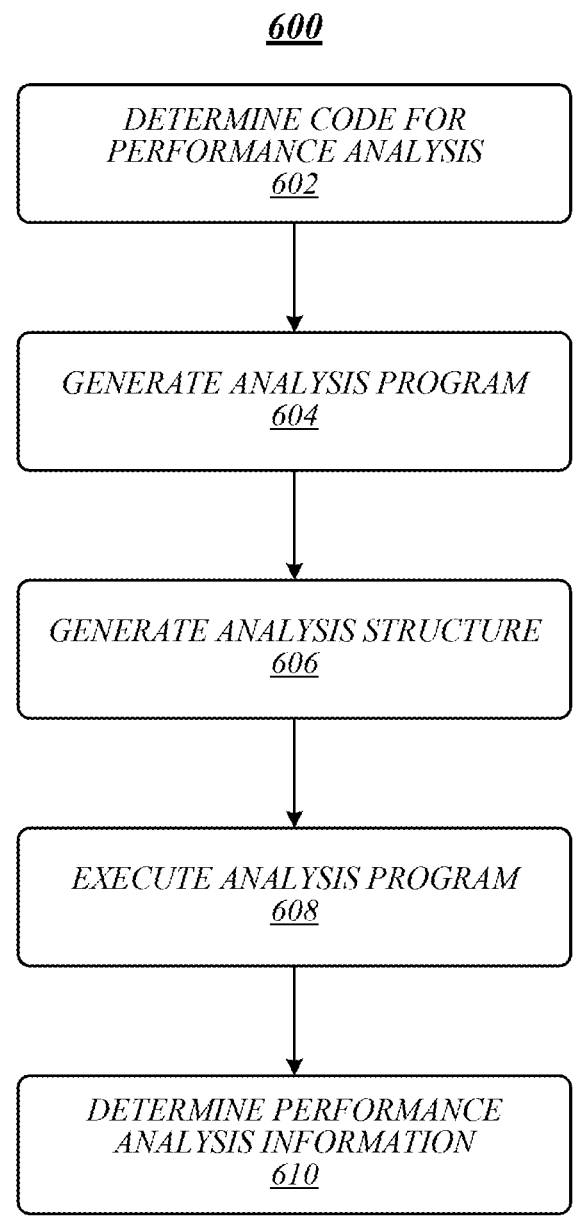
FIG. 6. illustrates an embodiment of a first logic flow.

FIG. 6 illustrates an embodiment of a logic flow 600. Logic flow 600 may be representative of some or all of the operations executed by one or more embodiments described herein, such as apparatus 105 and/or 205. In some embodiments, logic flow 500 may be representative of some or all of the operations of a performance analysis process.

Logic flow 600 may determine code for performance analysis at block 602. For example, performance analysis logic 120 may receive code or may receive instructions to analysis code, such as code stored in performance analysis information or code of one of applications 150*a*-*n*. In some embodiments, the code for analysis may be in various forms, such as assembly language, machine language, combinations thereof, and/or the like.

At block 604, logic flow 600 may generate an analysis program. For example, program structure logic 122 may analyze program 305*a* to determine target producer instructions (for instance, SEND instruction 310) and associated consumer instructions (for instance, ADD instruction 318). Program structure logic 122 may operate to generate analysis program 305*b* by adding timing instructions to enable performance analysis logic (for instance, via performance timing logic) to determine timing performance of target instructions. For example, program structure logic 122 may include a time stamp instruction immediately before and immediately after a consumer of a target producer instructions, and an instruction to determine a difference between the two time stamp instructions. In some embodiments, the difference between the two time stamp instructions may indicate a stall time for the associated target producer instruction. For example, the value "B" of timing instruction 354 may be the stall time for SEND instruction 310.

At block 604, logic flow 600 may generate an analysis structure. For example, program structure logic 122 may operate to locate consumers of a target instruction by generating control-flow graphs, data dependency graphs, map structures, static map structures, and/or other analysis structures on the code of the program under analysis. In some embodiments, program structure logic 122 may generate analysis structures for code such as control-flow graph 405 and/or control-flow graph 505 based on an analysis program, such as analysis program 305*b*. In some embodiments, program structure logic 122 may store bi-directional maps for an analyzed program, such as within performance analysis information 140. The bi-directional maps may map each producer instruction to all possible consumer instructions, and may map each consumer instruction to all possible producer instructions.

Logic flow 600 may execute the analysis program at block 608. For example, performance analysis logic 120 (for instance, via processing circuitry 110) may cause analysis program 305*b* to be executed. The execution of analysis program 305*b* may generate performance analysis information, such as stall times, traces, and/or the like. At block 610, logic flow 600 may determine performance analysis information 610. For example, performance analysis logic 120 (for instance, via performance timing logic 124) may determine performance analysis information 140 for analyzing the performance of various aspects of analysis program, such as the stall times of consumer instructions, including dynamic analysis of different traces through an analysis program.

Figure 7:
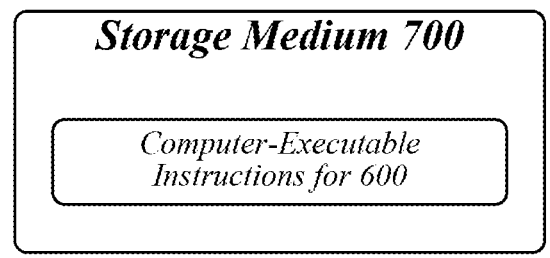
FIG. 7 illustrates an example of a storage medium.

FIG. 7 illustrates an example of a storage medium 700. Storage medium 700 may comprise an article of manufacture. In some examples, storage medium 700 may include any non-transitory computer readable medium or machine readable medium, such as an optical, magnetic or semiconductor storage. Storage medium 700 may store various types of computer executable instructions, such as instructions to implement logic flow 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
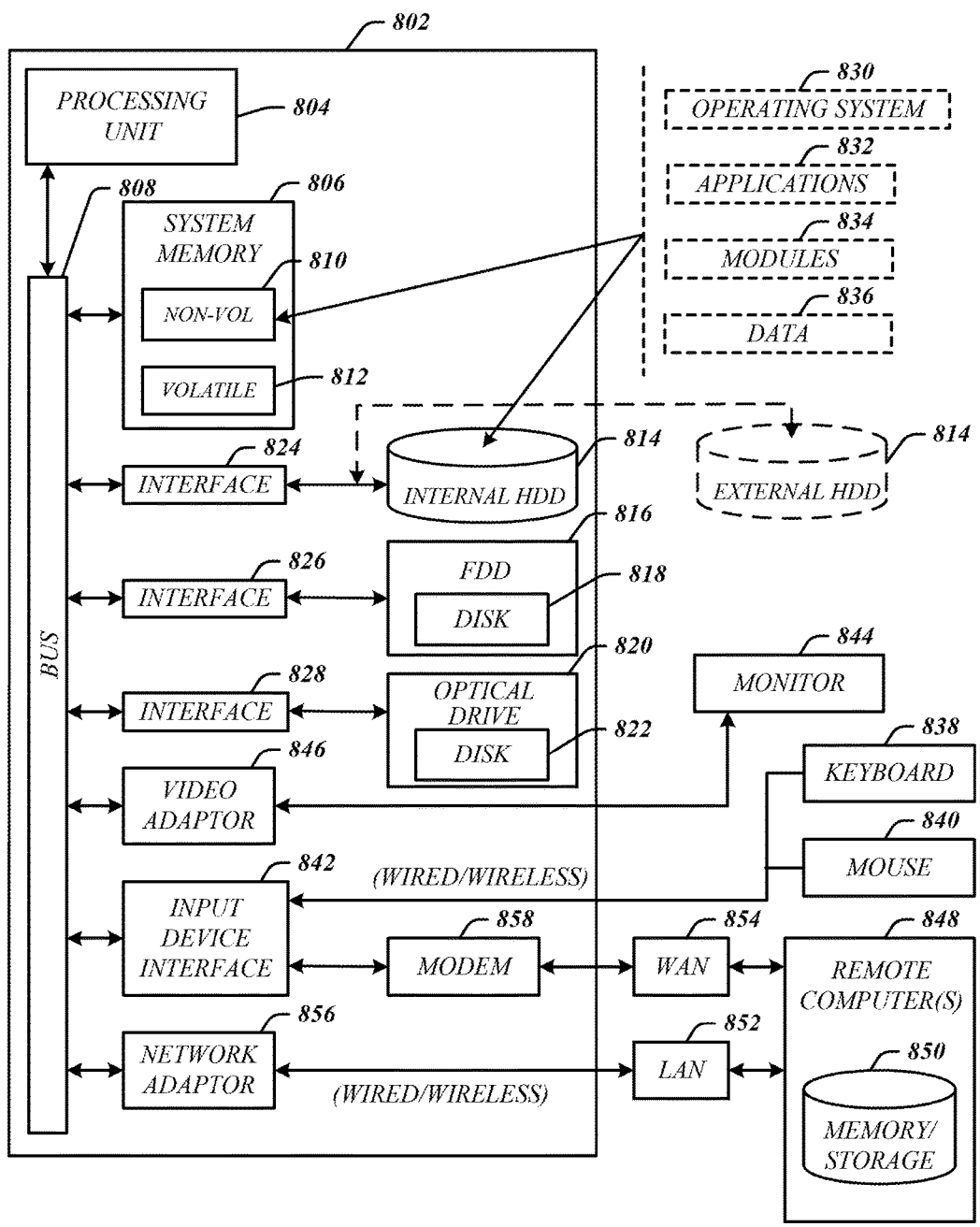
FIG. 8 illustrates an embodiment of a computing architecture.

FIG. 8 illustrates an embodiment of an exemplary computing architecture 800 suitable for implementing various embodiments as previously described. In various embodiments, the computing architecture 800 may comprise or be implemented as part of an electronic device. In some embodiments, the computing architecture 800 may be representative, for example, of apparatus 105 or 205. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1384 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of apparatus 105 or 205.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1384 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following are non-limiting example embodiments:

Example 1 is an apparatus, comprising: at least one memory; and logic, at least a portion of comprised in hardware coupled to the at least one memory, to: access a program for performance analysis, the program comprising at least one producer instruction and at least one consumer instruction for the at least one producer instruction, and generate an analysis program based on the program, the analysis program comprising a stall time instruction set to determine a stall time of the at least one producer instruction, the stall time instruction set comprising a first time stamp instruction immediately preceding the at least one consumer instruction, a second time stamp instruction immediately following the at least one consumer instruction, and a stall time instruction to determine the stall time as the difference between the second time stamp and the first time stamp.

Example 2 is the apparatus of Example 1, the logic to generate an analysis structure for the analysis program.

Example 3 is the apparatus of Example 1, the logic to generate an analysis structure for the analysis program, the analysis structure comprising at least one control-flow graph.

Example 4 is the apparatus of Example 1, the logic to generate an analysis structure for the analysis program based on machine code of the program.

Example 5 is the apparatus of Example 1, the logic to generate an analysis structure for the analysis program, the analysis structure comprising at least one dynamic control-flow trace.

Example 6 is the apparatus of Example 1, the at least one consumer comprising one consumer and the at least one producer comprising a plurality of producers configured to provide data to the one consumer, the analysis program comprising at least one tracing instruction to determine which of the plurality of producers provided the data to the one consumer.

Example 7 is the apparatus of Example 1, the logic to execute the analysis program to determine the stall time for the at least one producer.

Example 8 is the apparatus of Example 1, the logic to store the stall time for the at least one producer as performance analysis information in the at least one memory.

Example 9 is the apparatus of Example 1, the logic to generate at least one bi-directional map for the program by mapping the at least one producer instruction to all possible consumer instructions and mapping the at least one consumer instruction to all possible producer instructions.

Example 10 is the apparatus of Example 1, the at least one producer instruction comprising a SEND instruction.

Example 11 is the apparatus of Example 1, the stall time to indicate a duration of time that the consumer instruction is stalled until an end result of the at least one producer instruction is available for consumption by the consumer instruction.

Example 12 is the apparatus of Example 1, the at least one producer instruction comprising a plurality of producer instructions, the consumer instruction comprising a consumer of one of the plurality of producer instructions, the logic to generate at least one dynamic control-flow trace to identify one of the plurality of producer instructions operating as a producer for the consumer instruction.

Example 13 is the apparatus of Example 1, the first time stamp instruction and the second time stamp instruction comprising a read time-stamp counter instruction (RDTSC).

Example 14 is a system, comprising: the apparatus according to any of claims 1-13; and at least one network interface.

Example 15 is a method, comprising: accessing a program for performance analysis, the program comprising at least one producer instruction and at least one consumer instruction for the at least one producer instruction; and generating an analysis program based on the program, the analysis program comprising a stall time instruction set to determine a stall time of the at least one producer instruction, the stall time instruction set comprising a first time stamp instruction immediately preceding the at least one consumer instruction, a second time stamp instruction immediately following the at least one consumer instruction, and a stall time instruction to determine the stall time as the difference between the second time stamp and the first time stamp.

Example 16 is the method of Example 15, comprising generating an analysis structure for the analysis program.

Example 17 is the method of Example 15, comprising generating an analysis structure for the analysis program, the analysis structure comprising at least one control-flow graph.

Example 18 is the method of Example 15, comprising generating an analysis structure for the analysis program based on machine code of the program.

Example 19 is the method of Example 15, comprising generating an analysis structure for the analysis program, the analysis structure comprising at least one dynamic control-flow trace.

Example 20 is the method of Example 15, the at least one consumer comprising one consumer and the at least one producer comprising a plurality of producers configured to provide data to the one consumer, the analysis program comprising at least one tracing instruction to determine which of the plurality of producers provided the data to the one consumer.

Example 21 is the method of Example 15, comprising executing the analysis program to determine the stall time for the at least one producer.

Example 22 is the method of Example 15, comprising storing the stall time for the at least one producer as performance analysis information in the at least one memory.

Example 23 is the method of Example 15, comprising generating at least one bi-directional map for the program by mapping the at least one producer instruction to all possible consumer instructions and mapping the at least one consumer instruction to all possible producer instructions.

Example 24 is the method of Example 15, the at least one producer instruction comprising a SEND instruction.

Example 25 is the method of Example 15, the stall time to indicate a duration of time that the consumer instruction is stalled until an end result of the at least one producer instruction is available for consumption by the consumer instruction.

Example 26 is the method of Example 15, the at least one producer instruction comprising a plurality of producer instructions, the consumer instruction comprising a consumer of one of the plurality of producer instructions, comprising generating at least one dynamic control-flow trace to identify one of the plurality of producer instructions operating as a producer for the consumer instruction.

Example 27 is the method of Example 15, the first time stamp instruction and the second time stamp instruction comprising a read time-stamp counter instruction (RDTSC).

Example 28 is a non-transitory computer-readable storage medium that stores computer-executable instructions for execution by processing circuitry of a computing device to generate invariant-reference compressed data, the computer-executable instructions, when executed, to cause the computing device to: access a program for performance analysis, the program comprising at least one producer instruction and at least one consumer instruction for the at least one producer instruction; and generate an analysis program based on the program, the analysis program comprising a stall time instruction set to determine a stall time of the at least one producer instruction, the stall time instruction set comprising a first time stamp instruction immediately preceding the at least one consumer instruction, a second time stamp instruction immediately following the at least one consumer instruction, and a stall time instruction to determine the stall time as the difference between the second time stamp and the first time stamp.

Example 29 is the computer-readable storage medium of Example 28, the computer-executable instructions, when executed, to cause the computing device to generate an analysis structure for the analysis program.

Example 30 is the computer-readable storage medium of Example 28, the computer-executable instructions, when executed, to cause the computing device to generate an analysis structure for the analysis program, the analysis structure comprising at least one control-flow graph.

Example 31 is the computer-readable storage medium of Example 28, the computer-executable instructions, when executed, to cause the computing device to generate an analysis structure for the analysis program based on machine code of the program.

Example 32 is the computer-readable storage medium of Example 28, the computer-executable instructions, when executed, to cause the computing device to generate an analysis structure for the analysis program, the analysis structure comprising at least one dynamic control-flow trace.

Example 33 is the computer-readable storage medium of Example 28, the at least one consumer comprising one consumer and the at least one producer comprising a plurality of producers configured to provide data to the one consumer, the analysis program comprising at least one tracing instruction to determine which of the plurality of producers provided the data to the one consumer.

Example 34 is the computer-readable storage medium of Example 28, the computer-executable instructions, when executed, to cause the computing device to execute the analysis program to determine the stall time for the at least one producer.

Example 35 is the computer-readable storage medium of Example 28, the computer-executable instructions, when executed, to cause the computing device to store the stall time for the at least one producer as performance analysis information in the at least one memory.

Example 36 is the computer-readable storage medium of Example 28, the computer-executable instructions, when executed, to cause the computing device to generate at least one bi-directional map for the program by mapping the at least one producer instruction to all possible consumer instructions and mapping the at least one consumer instruction to all possible producer instructions.

Example 37 is the computer-readable storage medium of Example 28, the at least one producer instruction comprising a SEND instruction.

Example 38 is the computer-readable storage medium of Example 28, the stall time to indicate a duration of time that the consumer instruction is stalled until an end result of the at least one producer instruction is available for consumption by the consumer instruction.

Example 39 the computer-readable storage medium of Example 28, the at least one producer instruction comprising a plurality of producer instructions, the consumer instruction comprising a consumer of one of the plurality of producer instructions, the computer-executable instructions, when executed, to cause the computing device to generate at least one dynamic control-flow trace to identify one of the plurality of producer instructions operating as a producer for the consumer instruction.

Example 40 is the computer-readable storage medium of Example 28, the first time stamp instruction and the second time stamp instruction comprising a read time-stamp counter instruction (RDTSC).

Example 41 is an apparatus, comprising: a program access means to access a program for performance analysis, the program comprising at least one producer instruction and at least one consumer instruction for the at least one producer instruction, and a program analysis means to generate an analysis program based on the program, the analysis program comprising a stall time instruction set to determine a stall time of the at least one producer instruction, the stall time instruction set comprising a first time stamp instruction immediately preceding the at least one consumer instruction, a second time stamp instruction immediately following the at least one consumer instruction, and a stall time instruction to determine the stall time as the difference between the second time stamp and the first time stamp.

Example 42 is the apparatus of Example 41, the program analysis means to generate an analysis structure for the analysis program.

Example 43 is the apparatus of Example 41, the program analysis means to generate an analysis structure for the analysis program, the analysis structure comprising at least one control-flow graph.

Example 44 is the apparatus of Example 41, the program analysis means to generate an analysis structure for the analysis program based on machine code of the program.

Example 45 is the apparatus of Example 41, the program analysis means to generate an analysis structure for the analysis program, the analysis structure comprising at least one dynamic control-flow trace.

Example 46 is the apparatus of Example 41, the at least one consumer comprising one consumer and the at least one producer comprising a plurality of producers configured to provide data to the one consumer, the analysis program comprising at least one tracing instruction to determine which of the plurality of producers provided the data to the one consumer.

Example 47 is the apparatus of Example 41, a program execution means to execute the analysis program to determine the stall time for the at least one producer.

Example 48 is the apparatus of Example 41, the program analysis means to store the stall time for the at least one producer as performance analysis information in the at least one memory.

Example 49 is the apparatus of Example 41, the program analysis means to generate at least one bi-directional map for the program by mapping the at least one producer instruction to all possible consumer instructions and mapping the at least one consumer instruction to all possible producer instructions.

Example 50 is the apparatus of Example 41, the at least one producer instruction comprising a SEND instruction.

Example 51 is the apparatus of Example 41, the stall time to indicate a duration of time that the consumer instruction is stalled until an end result of the at least one producer instruction is available for consumption by the consumer instruction.

Example 52 is the apparatus of Example 41, the at least one producer instruction comprising a plurality of producer instructions, the consumer instruction comprising a consumer of one of the plurality of producer instructions, the program analysis means to generate at least one dynamic control-flow trace to identify one of the plurality of producer instructions operating as a producer for the consumer instruction.

Example 53 is the apparatus of Example 41, the first time stamp instruction and the second time stamp instruction comprising a read time-stamp counter instruction (RDTSC).

Example 54 is a system, comprising: the apparatus according to any of examples 41-53; and at least one network interface.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   a memory comprising instructions and a program; and
   a circuitry coupled to the memory, the circuitry arranged to execute the instructions, which when executed cause the circuitry to:
   access the program for performance analysis, the program comprising at least one producer instruction and at least one consumer instruction for the at least one producer instruction, wherein the at least one producer instruction is configured to provide data to the at least one consumer instruction, and the at least one consumer instruction is configured to receive the data from the at least one producer instruction; and
   generate an analysis program based on the program, the analysis program comprising a stall time instruction set to determine a stall time of the at least one producer instruction, the stall time instruction set comprising a first time stamp instruction immediately preceding the at least one consumer instruction, a second time stamp instruction immediately following the at least one consumer instruction, and a stall time instruction to determine the stall time as a difference between the second time stamp and the first time stamp.

2. The apparatus of claim 1, the instructions, when executed by the circuitry, cause the circuitry to generate an analysis structure for the analysis program.

3. The apparatus of claim 1, the instructions, when executed by the circuitry, cause the circuitry to generate an analysis structure for the analysis program, the analysis structure comprising at least one control-flow graph.

4. The apparatus of claim 1, the instructions, when executed by the circuitry, cause the circuitry to generate an analysis structure for the analysis program based on machine code of the program.

5. The apparatus of claim 1, the instructions, when executed by the circuitry, cause the circuitry to generate an analysis structure for the analysis program, the analysis structure comprising at least one dynamic control-flow trace.

6. The apparatus of claim 1, the at least one consumer instruction comprising one consumer instruction and the at least one producer instruction comprising a plurality of producer instructions configured to provide data to the one consumer instruction;
   the analysis program comprising at least one tracing instruction to determine which of the plurality of producer instructions provided the data to the one consumer instruction.

7. The apparatus of claim 1, the instructions, when executed by the circuitry, cause the circuitry to execute the analysis program to determine the stall time for the at least one producer instruction.

8. The apparatus of claim 1, the instructions, when executed by the circuitry, cause the circuitry to store the stall time for the at least one producer instruction as performance analysis information in the at least one memory.

9. The apparatus of claim 1, the instructions, when executed by the circuitry, cause the circuitry to generate at least one bi-directional map for the program by mapping the at least one producer instruction to all possible consumer instructions and mapping the at least one consumer instruction to all possible producer instructions.

10. The apparatus of claim 1, the at least one producer instruction comprising a SEND instruction.

11. A method, comprising:
    accessing, from a memory, a program for performance analysis, the program comprising at least one producer instruction and at least one consumer instruction for the at least one producer instruction, wherein the at least one producer instruction is configured to provide data to the at least one consumer instruction, and the at least one consumer instruction is configured to receive the data from the at least one producer instruction; and
    generating an analysis program based on the program, the analysis program comprising a stall time instruction set to determine a stall time of the at least one producer instruction, the stall time instruction set comprising a first time stamp instruction immediately preceding the at least one consumer instruction, a second time stamp instruction immediately following the at least one consumer instruction, and a stall time instruction to determine the stall time as a difference between the second time stamp and the first time stamp.

12. The method of claim 11, comprising generating an analysis structure for the analysis program.

13. The method of claim 11, comprising generating an analysis structure for the analysis program, the analysis structure comprising at least one control-flow graph.

14. The method of claim 11, comprising generating an analysis structure for the analysis program based on machine code of the program.

15. The method of claim 11, comprising generating an analysis structure for the analysis program, the analysis structure comprising at least one dynamic control-flow trace.

16. The method of claim 11, the at least one consumer instruction comprising one consumer instruction and the at least one producer instruction comprising a plurality of producer instructions configured to provide data to the one consumer instruction,
    the analysis program comprising at least one tracing instruction to determine which of the plurality of producer instruction provided the data to the one consumer instruction.

17. The method of claim 11, comprising executing the analysis program to determine the stall time for the at least one producer instruction.

18. The method of claim 11, comprising storing the stall time for the at least one producer instruction as performance analysis information in the at least one memory.

19. The method of claim 11, comprising generating at least one bi-directional map for the program by mapping the at least one producer instruction to all possible consumer instructions and mapping the at least one consumer instruction to all possible producer instructions.

20. The method of claim 11, the at least one producer instruction comprising a SEND instruction.

21. A non-transitory computer-readable storage medium that stores computer-executable instructions for execution by processing circuitry of a computing device to generate invariant-reference compressed data, the computer-executable instructions, when executed, to cause the computing device to:

access a program for performance analysis, the program comprising at least one producer instruction and at least one consumer instruction for the at least one producer instruction, wherein the at least one producer instruction is configured to provide data to the at least one consumer instruction, and the at least one consumer instruction is configured to receive the data from the at least one producer instruction; and generate an analysis program based on the program, the analysis program comprising a stall time instruction set to determine a stall time of the at least one producer instruction, the stall time instruction set comprising a first time stamp instruction immediately preceding the at least one consumer instruction, a second time stamp instruction immediately following the at least one consumer instruction, and a stall time instruction to determine the stall time as a difference between the second time stamp and the first time stamp.

22. The non-transitory computer-readable storage medium of claim 21, the computer-executable instructions, when executed, to cause the computing device to generate an analysis structure for the analysis program.

23. The non-transitory computer-readable storage medium of claim 21, the computer-executable instructions, when executed, to cause the computing device to generate an analysis structure for the analysis program, the analysis structure comprising at least one control-flow graph.

24. The non-transitory computer-readable storage medium of claim 21, the computer-executable instructions, when executed, to cause the computing device to generate an analysis structure for the analysis program based on machine code of the program.

25. The non-transitory computer-readable storage medium of claim 21, the computer-executable instructions, when executed, to cause the computing device to execute the analysis program to determine the stall time for the at least one producer instruction.

\* \* \* \* \*

UNITED STATES PATENT AND TRADEMARK OFFICE
CERTIFICATE OF CORRECTION

PATENT NO. : 10,467,118 B2
APPLICATION NO. : 15/718435
DATED : November 5, 2019
INVENTOR(S) : Konstantin Levit-Gurevich et al.

Page 1 of 1

It is certified that error appears in the above-identified patent and that said Letters Patent is hereby corrected as shown below:

In the Claims

Column 20, Line 20, Claim 8, replace "in the at least one memory" with -- in the memory --.

Signed and Sealed this
Fourth Day of February, 2020

Andrei Iancu
*Director of the United States Patent and Trademark Office*